US012810832B2

(12) United States Patent
Stanford

(10) Patent No.: US 12,810,832 B2
(45) Date of Patent: Nov. 24, 2026

(54) SOUND SYNTHESIZER AND METHOD

(71) Applicant: Nigel John Stanford, Roseneath (NZ)

(72) Inventor: Nigel John Stanford, Roseneath (NZ)

( * ) Notice: Subject to any disclaimer, the term of this patent is extended or adjusted under 35 U.S.C. 154(b) by 822 days.

(21) Appl. No.: 18/205,520

(22) Filed: Jun. 3, 2023

(65) Prior Publication Data

US 2024/0071348 A1 Feb. 29, 2024

Related U.S. Application Data

(60) Provisional application No. 63/400,710, filed on Aug. 24, 2022.

(51) Int. Cl.
*G10H 5/00* (2006.01)

(52) U.S. Cl.
CPC ....... *G10H 5/007* (2013.01); *G10H 2250/511* (2013.01)

(58) Field of Classification Search
CPC ......................... G10H 5/007; G10H 2250/511
USPC ........................................................... 84/622
See application file for complete search history.

(56) References Cited

U.S. PATENT DOCUMENTS 4,649,783 A * 3/1987 Strong ..................... G10H 7/02 84/622
5,248,842 A * 9/1993 Saito ........................ G10H 7/02 84/622
5,668,338 A * 9/1997 Hewitt .................... G06F 3/162 84/629
5,744,739 A * 4/1998 Jenkins .................... G10H 7/02 84/661
5,920,842 A * 7/1999 Cooper ............. H04N 21/4316 704/211
6,281,423 B1 * 8/2001 Shimizu ................... G10H 7/02 84/622
6,316,710 B1 * 11/2001 Lindemann .............. G10H 7/02 84/622
6,362,409 B1 * 3/2002 Gadre ................. G10H 1/0041 84/622
6,535,772 B1 * 3/2003 Miyamori ............ G10H 1/0041 84/645
8,219,223 B1 * 7/2012 Ramirez ................ G11B 27/34 381/119
2009/0315889 A1 * 12/2009 Tognola .................. G06T 11/26 345/440
2010/0100390 A1 * 4/2010 Tanaka .................. G10L 19/097 704/503
2012/0072208 A1 * 3/2012 Krishnan .............. G10L 19/097 704/207
2012/0166187 A1 * 6/2012 Van Buskirk .......... G10H 7/004 381/98

(Continued)

FOREIGN PATENT DOCUMENTS

JP H0497197 A * 3/1992
JP 2007011217 A * 1/2007 ............. G10H 7/008
JP 2008176043 A * 7/2008

*Primary Examiner* — Christina M Schreiber
(74) *Attorney, Agent, or Firm* — Todd Martin

(57) ABSTRACT

A sound synthesizer including an audio import system, a database, and a processor. The processor is configured to compile audio data into a cycle map to represent pitch as a series of variable lengths, and volume as a series of variable heights. The processor is further configured to compile the audio data into an arc map to represent audio data as a series of variable lengths, and volume as a series of variable heights.

10 Claims, 6 Drawing Sheets

(56) References Cited

U.S. PATENT DOCUMENTS

| | | | | |
|---|---|---|---|---|
| 2021/0279030 | A1* | 9/2021 | Morsy | G06F 3/165 |
| 2023/0335091 | A1* | 10/2023 | Morsy | G10H 1/0025 |
| 2023/0377591 | A1* | 11/2023 | Hantrakul | G10H 7/04 |
| 2024/0071348 | A1* | 2/2024 | Stanford | G10H 5/007 |

* cited by examiner

SOUND SYNTHESIZER AND METHOD

FIELD OF THE INVENTION

The present description relates to improvements in audio recording and playback equipment for enhancing sound quality of recordings.

BACKGROUND OF THE INVENTION

In an Audio synthesizer, sounds are created by an oscillating signal, such as a sine wave. A repeating pattern in the signal can be considered a cycle.

The shape of the cycle determines its "tone" or brightness, and the cycles per second, or frequency determines the perceived pitch of the note. The more cycles per second, the higher the note. A synthesizer can typically generate a number of shapes to create different tones, such as a square, triangle, or sine wave. A square wave has a different tone from the sine wave, but if it has the same number of cycles per second, it will have the same pitch.

In a "Wavetable synthesizer", cycles are stored as very short pieces of digital audio, typically with 256 to 2,048 points of data. During playback, the synthesizer will repeatedly play back the data from the cycle at a given frequency. A "wavetable" is a collection of single cycle waves, typically in an array of up to 128 cycles. During playback, the cycle that is being played can be changed to a different cycle in the array, changing the tone of the sound. Pairs of cycles can be interpolated over time, to ensure a smoothly evolving sound. The frequency and volume of the playback can be altered, typically being modulated from other sources, such as envelopes or low frequency oscillations. While wavetable synthesis is good for creating synthesized sounds that evolve, it is not as suitable for recreating acoustic sounds with more complex structures, such as a person singing or talking.

Such sounds contain repeating and evolving cycles, where each cycle may have a different volume and an evolving pitch. A traditional wavetable synthesizer could store a selection of these cycles in a wavetable, but playback would not match the original acoustic sound very well, as it does not store information for the pitch and volume of each cycle in the original acoustic sound. Most wavetable synthesizers are not designed to try to recreate acoustic sounds.

It will be clearly understood that, if a prior art publication is referred to herein, this reference does not constitute an admission that the publication forms part of the common general knowledge in the art in the United States of America, New Zealand, Australia or in any other country.

SUMMARY

In a preferred aspect, the present disclosure describes a way, hereinafter termed "UltraWave", to recreate a complex sound. In UltraWave, the audio, frequency and volume data are stored for each cycle of an imported sound in a "Cycle Map". The Cycle Map is used in conjunction with the wave data in the wavetable to recreate a complex sound. Using UltraWave, it is possible to recreate recorded sounds much more precisely than conventional wavetable synthesizers, by altering the pitch and volume of each cycle over time.

Each cycle in the map may also contain an "Arc Map." The Arc Map describes a way to store information about the shape of the data within the cycle in an efficient manner. This Arc Map data can then be used to manipulate the audio data contained within the Cycle Data.

The present disclosure in one preferred aspect provides for a sound synthesizer. The sound synthesizer includes a database configured to store audio data; and a processor configured to compile the audio data into a Cycle Map configured to represent pitch as a series of variable lengths and volume as a series of variable heights. In one or more preferred aspects, the audio recorder is digital. The sound synthesizer further includes an audio output configured to play the recorded audio according to the Cycle Map for a given recording stored in the database.

In another preferred aspect, the present description provides a method for analysing audio to generate a Cycle Map. The method includes loading an audio segment to store audio data in a database; creating a Cycle Map for the audio segment, the Cycle Map containing data to represent the volume of each cycle of the audio segment; and data to represent the frequency of each cycle of the audio segment. The method further includes creating Cycle Maps in the left and right channels that are independent of each other.

In one or more preferred aspects, an Arc Map is a collection of Arcs created based on the length of time and maximum volume of each segment of audio between the zero crossings of each cycle. The audio data plotted along the X axis and Y axis of the Arc Map is represented as a series of orthogonal shapes to represent Arcs. The Arc Map may be used to manipulate the synthesized audio output while retaining some of the tonal characteristics of the original audio recording.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

It will be appreciated that reference herein to "preferred" or "preferably" is intended as exemplary only.

The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Detailed herein is a sound synthesizer that includes an audio import system, as a means to load digital audio data; a database configured to store the audio data; and a processor configured to compile the audio data into a Cycle Map (explained in further detail below).

Figure 1:
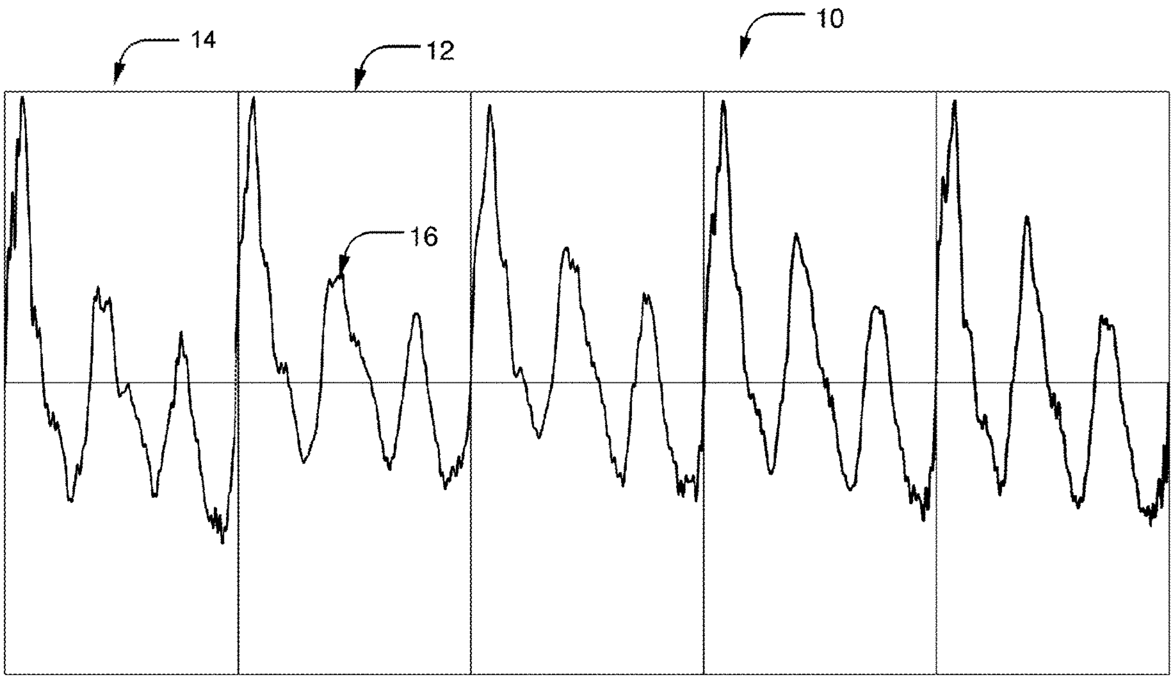
FIG.1 (Prior Art)
FIG. 1 is a diagrammatic view of an audio output of from a conventional wavetable synthesizer.
Figure 2:
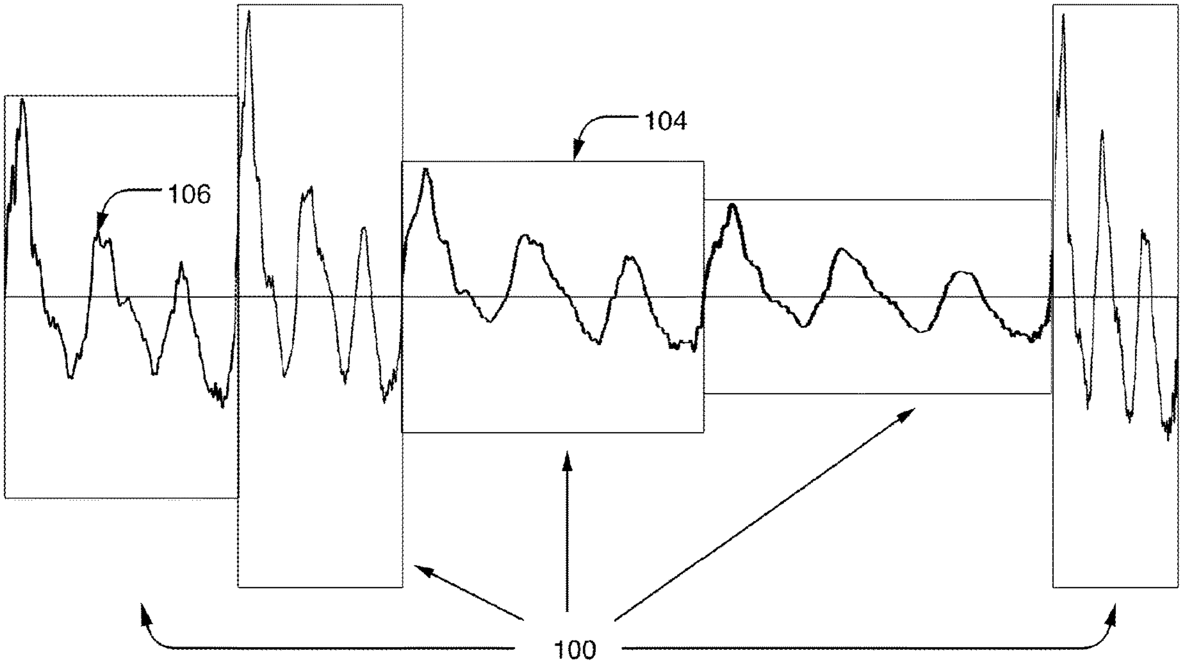
FIG. 2 is a diagrammatic view of a Cycle Map in accordance with a preferred embodiment of the present disclosure.

FIGS. 1 and 2 illustrate a difference between a playback of an acoustical sound from traditional wavetable synthesizer (FIG. 1), and an UltraWave using a Cycle Map 100 (FIG. 2). Wavetable 10 includes wavetable data 12 sectioned into cycles 14.

Wavetable 10 is configured to orient and represent audio data in terms of pitch (as a length along the X axis) and volume (as a height along the Y axis). In wavetable 10, each cycle has identical length and height, so that the sound played according to the wavetable does not match the original acoustical sound very well. Referring to FIG. 2, audio data is stored in the Cycle Map 100 as Cycle Map data 104 so that the pitch length and volume height is variable, more accurately representing the true audio segment.

Figure 3B:
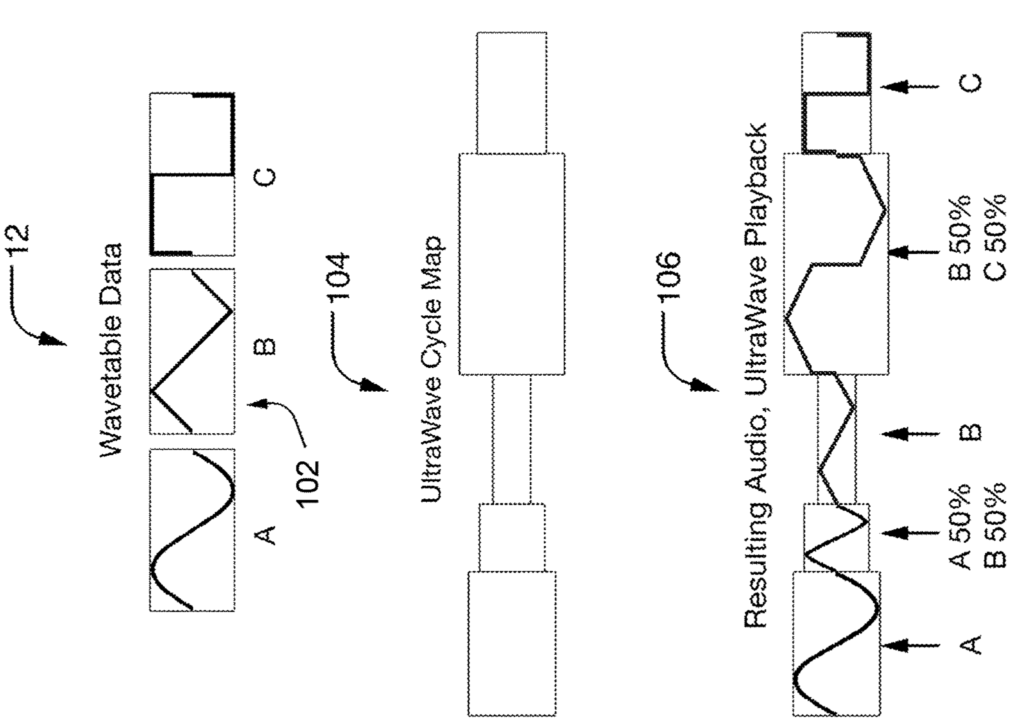
FIG. 3B is diagrammatic representation showing a resulting audio from the merger of traditional wavetable data and data from a Cycle Map.
Figure 3A:
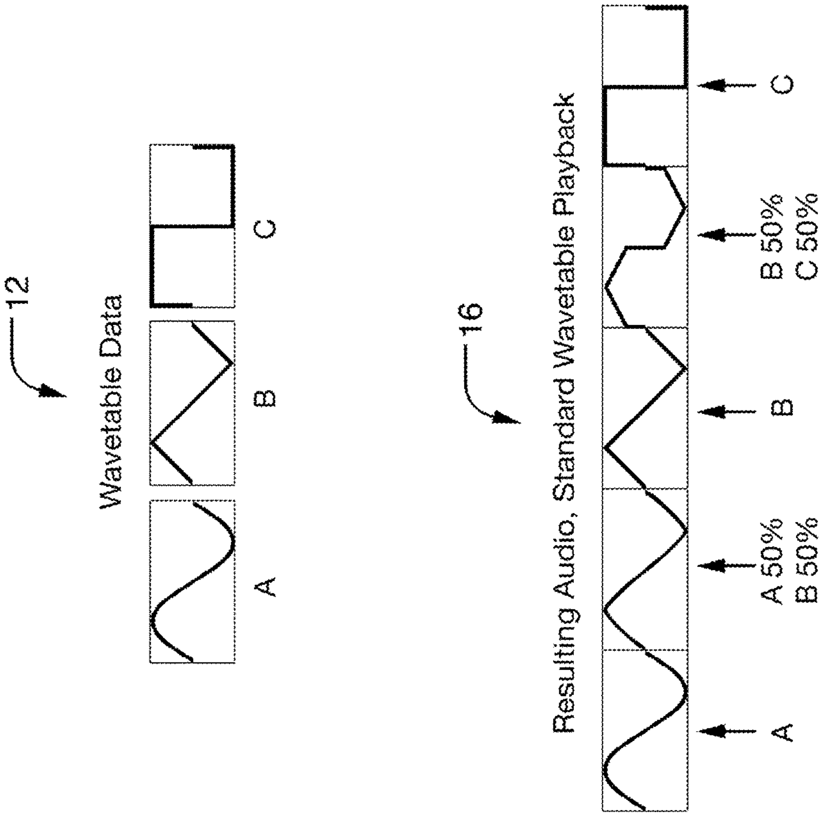
FIG.3A Prior Art
FIG. 3A is a diagrammatic representation showing resulting audio from a traditional wavetable synthesizer.

FIG. 3A shows an example of resulting audio 16 from typical wavetable data 12. As seen in FIG. 3A, the resulting audio is similar to the representation of the wavetable data. As seen in FIG. 3B, when audio data 102 is combined with Cycle Map data 104, the resulting audio 106 follows a more flexible wave curve, as shown in FIG. 3B. Although audio or wave table data is shown as being combined with Cycle Map data to generate resulting audio data 106, it will be appreciated that Cycle Map data 104 may be completely omitted so that the resulting audio data is based solely on the wave table data, if desired.

Figure 4:
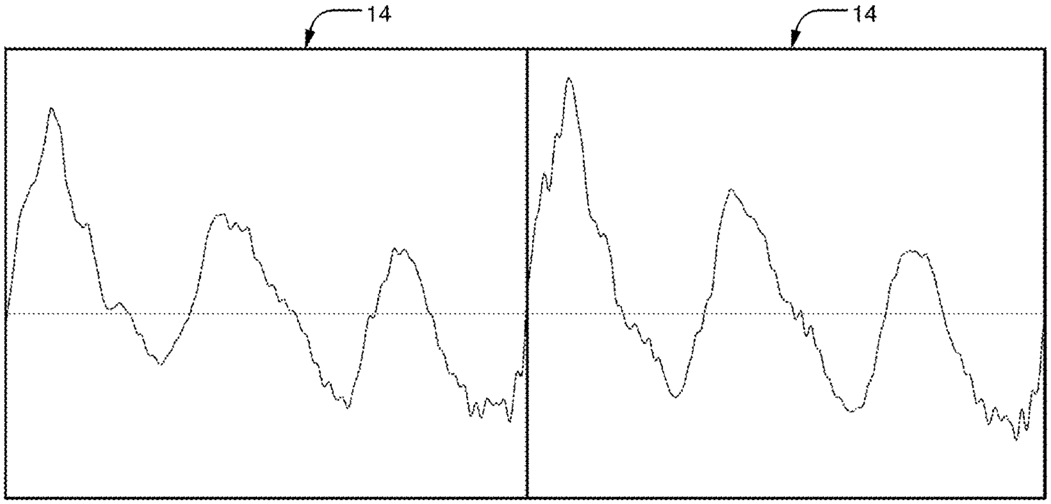
FIG.4 (Prior Art)
FIG. 4 shows two cycles from an analysed section of audio.
Figure 5:
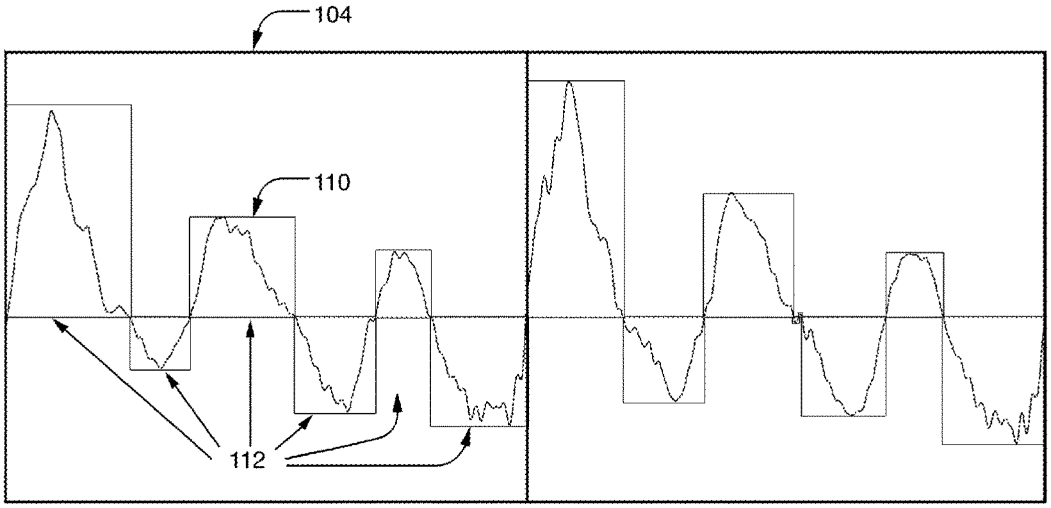
FIG. 5 shows an Arc Map for the cycles shown in FIG. 4.
Figure 6:
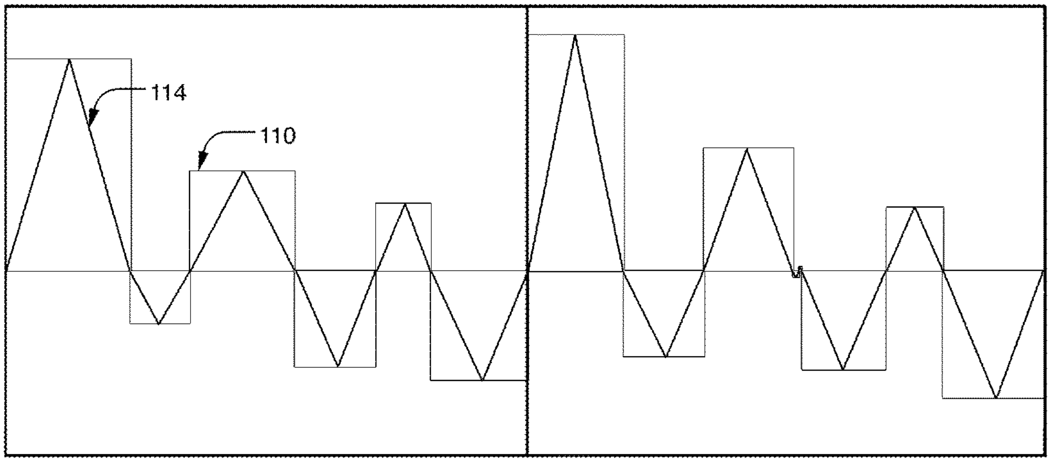
FIG. 6 shows an Arc Map replacing the original wave data with triangle waves.

FIGS. 4 to 6 help illustrate use of an Arc Map. An Arc Map is configured to store portions of each cycle. FIG. 4 shows audio data in a series of two cycles 14. FIG. 5 shows the cycle data 104 segmented in a series of arcs 110 to generate an Arc Map 112. Each arc 110 represents the data in an efficient manner that permits easier transformation of the data into an audio output. As used herein, an "arc" is the area between the zero crossings of the cycle. The arc can have a range of +1 to −1 in the Y axis. Use of an arc form also permits manipulation of the cycle in a way that better retains the characteristics of the original sound.

Audio within an Arc may be manipulated and altered if desired. For example, FIG. 6 shows the original audio being replaced by a triangular wave shape 114. In the example shown in FIG. 6, the triangular shapes change the tone of the sound without affecting the fundamental pitch. While "changing the tone" could be true of any distortion effect, manipulating the signal within an arc is a unique approach and may be used to create unusual and pleasing qualities not encountered with traditional distortion methods. The distorted version of the sound retains the tonal characteristics of the original sound in a way that is different compared to other distortion methods. Many other approaches can be used to manipulate the signal within the arc.

Figure 7A:
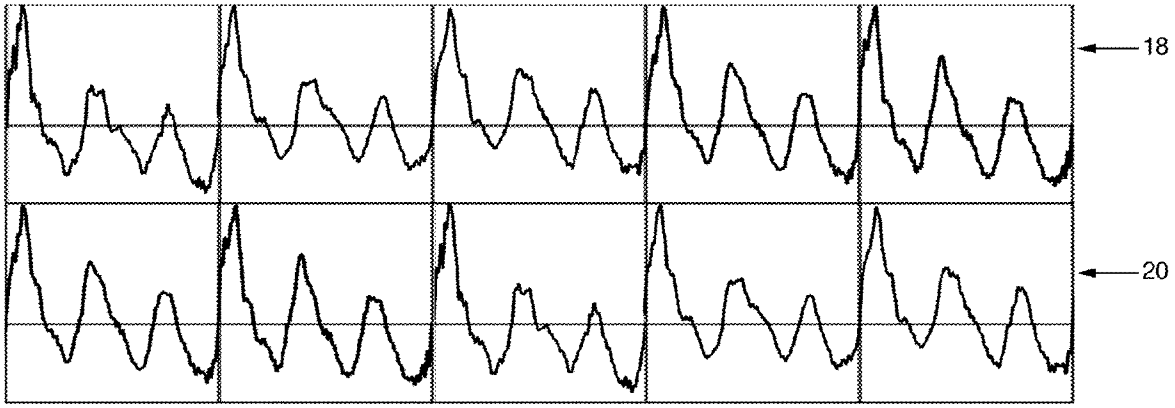
FIG.7A (Prior Art)
FIG. 7A shows the output from a traditional wavetable synthesizer in the left and right channels.

FIG. 7A shows the output of a traditional wavetable synthesiser played in a right channel 18 and a left channel

Figure 7B:
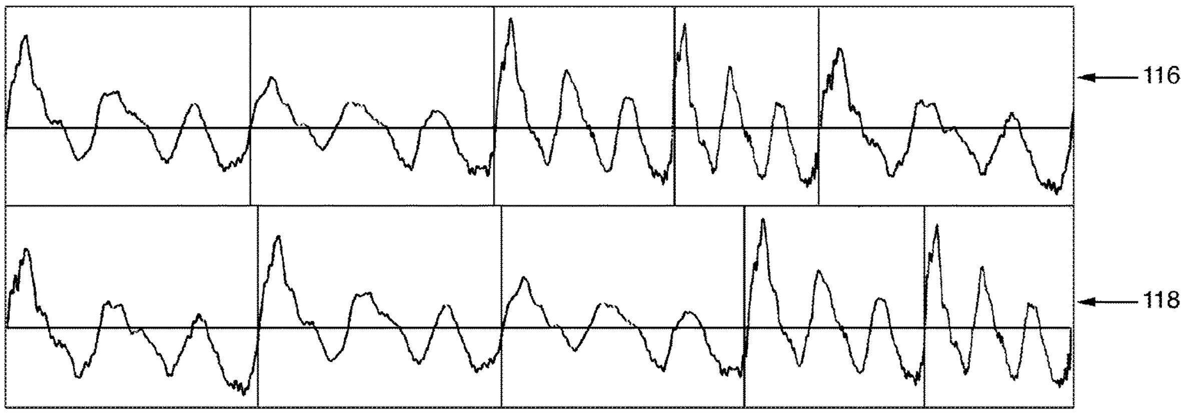
FIG. 7B shows wave data for the left and right channels according to a preferred aspect of the present disclosure.

20. As shown in FIG. 7A, each cycle crosses zero at the same location, is the same length, and therefore the left and right channels are locked in phase. FIG. 7B shows the audio data in a Cycle Map, divided into a right channel 116 and a left channel 118. As will be familiar to those in the field, left and right channels represent "true" stereo sound quality as perceived acoustically from a human perspective. In a true stereo signal, each channel contains cycles that are not in phase with each other. This outcome is possible, in a preferred aspect, using UltraWave, where the Cycle Map allows rendered cycles to be any length.

Figure 8:
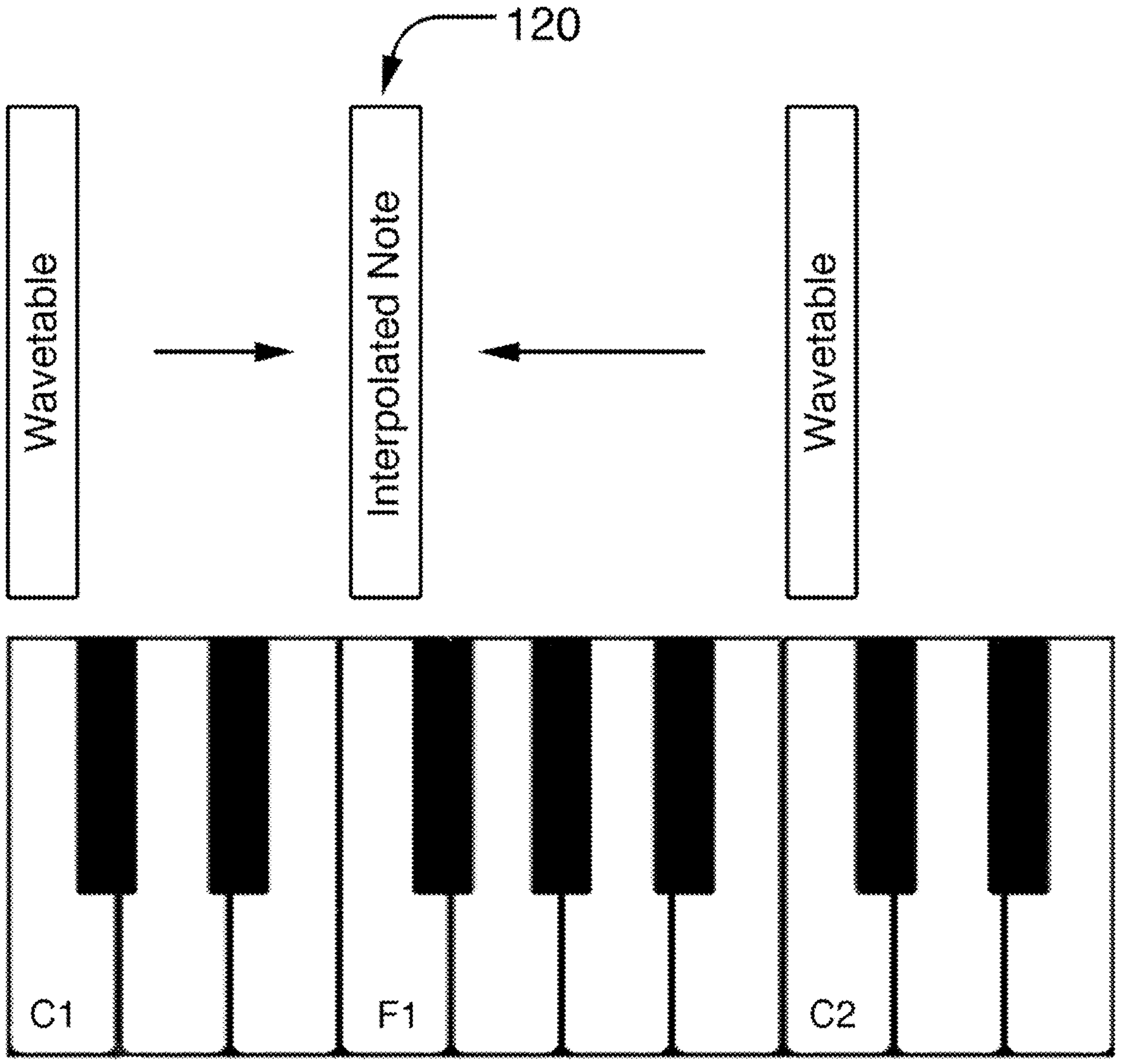
FIG. 8 is a representation showing construction of an intermediate sound from two wavetables of different pitches.

FIG. 8 shows a visual representation of the creation of a hybrid wavetable by means of an interpolation of two wavetables.

Different wavetables can be stored for each note and velocity, similar to a multi-sample synthesiser. If one wavetable was stored for each of the notes C1 and C2, the method using a Cycle Map configuration would allow an intermediate sound to be created as a hybrid of the two sounds. The same method could be used to generate an intermediate sound between two wavetables at different velocities.

In FIG. 8, when playing note F1 120, intermediate wavetable data can be constructed in real-time, by interpolating the data from the two wavetables stored on databases at notes C1 and C2.

Figure 9:
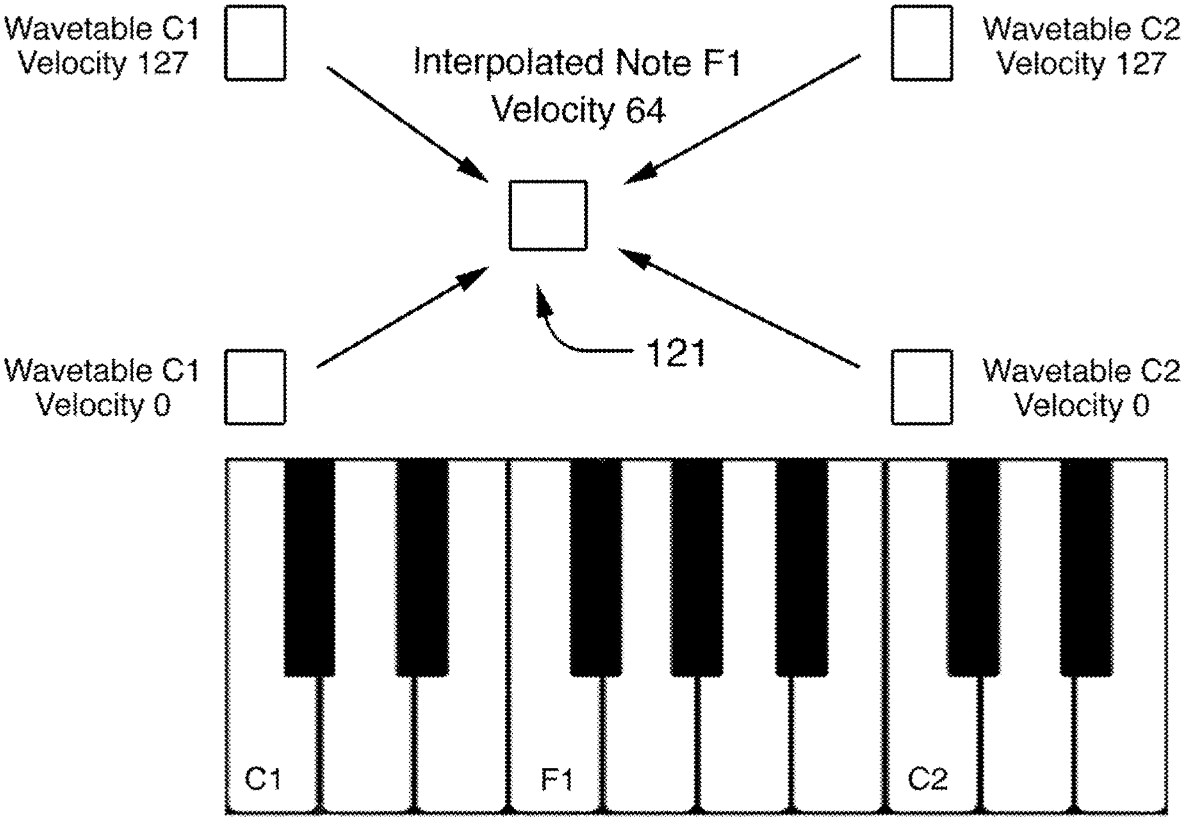
FIG. 9 is a representation showing construction of an intermediate sound from four wavetables of different pitches and velocities.

In FIG. 9, when playing note F1 121, intermediate wavetable data can be constructed in real-time, by interpolating the data from the four wavetables stored on database at note C1 velocity 0, note C1 velocity 127, note C2 velocity 0 and note C2 velocity 127.

Having described the preferred components of the Cycle Map and its use, a preferred method of creating the Cycle Map will now be described. First, the pitch frequency of the original sound is detected. Then, starting at an arbitrary zero crossing in the original sound, the processor identifies a cycle that is the correct length for the detected frequency. Thereafter, using the wave data of the cycle, the processor determines the end location of the next cycle, and adds the pitch and volume data into the Cycle Map.

The foregoing description is by way of example only, and may be varied considerably without departing from the scope of the present disclosure. For example only, the data for a Cycle Map could be obtained by utilising elements of artificial intelligence ("AI"), for example, training a genetic algorithm to recognize cycles and determine the cycle map data. The details of AI would be well understood by those of ordinary skill in the AI field.

The present description in a preferred form provides the advantages of creating stereo wavetable playback, allowing multiple Wavetables to be used to create intermediate Wavetables, to enable playback of more realistic acoustic sounds using a Cycle Map, to create unique distortion effects using an Arc Map, that often accompanies devices in the prior art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A sound synthesizer, including:

an audio import system;

a database configured to store audio data recorded by said audio import system, the audio data including both pitch data and volume data;

a processor configured to:

compile said audio data from said database into:

a cycle map configured to represent the pitch data as a first series of variable lengths and the volume data as a first series of variable heights; and an arc map configured to represent audio data as a second series of variable lengths and volume as a second series of variable heights; and transform the stored audio data according to the cycle map and the arc map; and an audio output configured to play the transformed audio data.

2. The synthesizer of claim 1, wherein the audio import system is digital.

3. The synthesizer of claim 1, wherein said processor is configured to modify the audio data according to the cycle map to be out of phase.

4. The synthesizer of claim 1, wherein the audio data includes music data, the synthesizer being configured to play only the music data according to the cycle map.

5. The synthesizer of claim 1, wherein said audio output is configured to simultaneously play audio data in left and right channels of an audio synthesizer, the audio data having different cycle lengths.

6. A method for recording audio to generate a cycle map, including:

recording to a database an audio segment including audio data, the audio data including a plurality of cycles;

creating a cycle map for the audio segment, the cycle map having an X axis and a Y axis where the X axis is configured to represent pitch data of a plurality of cycles of the audio segment, and the Y axis is configured to represent volume data of the cycles of the audio segment;

transforming, with a processor, the audio data into a first series of variable height volume data along the Y axis of the cycle map for each cycle recorded to the database, and a first series of variable length pitch data along the X axis for each cycle recorded to the database, the audio data being transformed with the first series of variable height volume data and the first series of variable length pitch data to provide an enhanced acoustic sound discernable to a human ear; and storing the transformed audio data in the database.

7. The method of claim 6, wherein the cycle map is created based on a detected frequency of the recorded audio segment where the frequency is variable.

8. The method of claim 6, wherein the audio data is further compiled in an arc map configured to represent each cycle of the audio data as a second series of variable lengths on an X axis and the volume data as a second series of variable heights on a Y axis, wherein the arc map is represented as a series of orthogonal shapes.

9. The method of claim 8, wherein the orthogonal shapes are configured to retain tonal characteristics of an original audio recording.

10. The method of claim 6, wherein the transformed audio data is configured to play in left and right channels of an audio synthesizer in an out of phase configuration.

* * * * *